United States Patent
Thomas et al.

(10) Patent No.: US 6,823,051 B1
(45) Date of Patent: Nov. 23, 2004

(54) TRAFFIC DISTRIBUTION GENERATOR

(75) Inventors: Charles David Thomas, Ashland, OR (US); Jay Allen Baker, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 50 days.

(21) Appl. No.: 09/832,418

(22) Filed: Apr. 10, 2001

(51) Int. Cl.⁷ .................. H04M 15/00; H04M 1/24; H04M 3/08
(52) U.S. Cl. .............. 379/112.01; 379/112.04; 379/112.05; 379/29.02; 379/133; 379/10.02
(58) Field of Search .............. 379/111, 112.01, 379/112.03, 112.04, 112.05, 112.1, 133, 134, 137, 265.01, 265.02, 265.08, 265.1, 266.01, 266.08, 269, 29.02, 1.01, 10.02, 10.03, 26.01

(56) References Cited

U.S. PATENT DOCUMENTS

| | | | | |
|---|---|---|---|---|
| 4,910,729 A | * | 3/1990 | Coffelt et al. | 370/251 |
| 5,291,550 A | * | 3/1994 | Levy et al. | 379/242 |
| 5,359,646 A | * | 10/1994 | Johnson et al. | 379/27.02 |
| 5,633,909 A | * | 5/1997 | Fitch | 379/29.01 |
| 5,724,418 A | * | 3/1998 | Brady | 379/265.02 |
| 5,761,272 A | * | 6/1998 | Williams et al. | 379/10.01 |
| 5,809,108 A | * | 9/1998 | Thompson et al. | 379/10.02 |
| 6,091,801 A | * | 7/2000 | Gulik | 379/29.02 |
| 6,173,244 B1 | * | 1/2001 | Pyritz | 703/20 |
| 6,178,235 B1 | * | 1/2001 | Petersen et al. | 379/134 |
| 6,252,950 B1 | * | 6/2001 | Duty et al. | 379/111 |
| 6,597,694 B1 | * | 7/2003 | Fondekar et al. | 370/389 |

* cited by examiner

*Primary Examiner*—Quoc Tran
(74) *Attorney, Agent, or Firm*—Marger, Johnson & McCollom, P.C.

(57) ABSTRACT

A method for generating and distributing telephonic traffic. The method includes receiving a call profile from a user interface, generating a traffic distribution from the call profile. The method then creates a traffic profile from the traffic distributions and receives at least one call hold time from a user interface, and then transmits the traffic profile and the at least one call hold time to a call generator. Also included is a traffic distribution generator. The traffic distribution generator includes a traffic graphical user interface, user input controls on the traffic graphical user interface and a processor to generate traffic distributions and the distribution and create a traffic profile from the distributions, and a port operable to transmit the traffic profile to a bulk call generator.

25 Claims, 5 Drawing Sheets

TRAFFIC DISTRIBUTION GENERATOR

BACKGROUND

1. Field

This disclosure relates to methods for testing telephonic systems, more particularly to a method for generating traffic profiles used in testing telephonic systems.

2. Background

Telephone networks have become increasingly complex and users require more capacity and higher reliability than ever before. Even the lower complexity public switched transmission networks (PSTN) now must accommodate more and more users with data lines for modem transmissions with ever-increasing demands for speed. Enterprise customers typically use integrated services digital networks (ISDN), and may have a mix of old and new equipment including bridges, gateways and private branch exchanges (PBX). Some even use voice over data networks applications, which require converters and network routers to be part of the telephone system.

The design and testing of these systems has likewise become very complex and critically important. The current speed of business does not allow for long down times to fix faulty designs or overcome capacity problems. Testing tools are available for testing and validating networks, but the ability of the average systems engineer or information technology engineer to comprehend and test all aspects of these networks is limited due to the complexity of the tools.

Some methods for providing user inputs to the testing systems require extensive loading of lookup tables through command prompts. One example of such a method is found in U.S. Pat. No. 6,091,801, issued Jul. 18, 2000, entitled "Emulator for a Telephone System." In this method, the user interface is a bare command prompt and the user enters the desired values for each field, one at a time. These fields are loaded into a lookup table and the lookup table is accessed for call simulation.

In other methods, the user is allowed to provide some inputs. However, the user-specified inputs are limited and other methods are preferred. An example of this type of method is shown in U.S. Pat. No. 5,652,791, issued Jul. 29, 1997, entitled "System and Method for Simulating Operation of an Automatic Call Distributor." The user typically only provides an input designating duration of the test.

Therefore, a method for allowing users to provide more detailed parameters for controlling the tests in a user-friendly way would seem useful.

SUMMARY

One aspect of the invention is a method for generating and distributing telephonic traffic. A call profile is received from a user interface. The call profile identifies a number of calls per time period for each of a series of points within duration of time. In one embodiment, the traffic profile identifies a number of calls per second for each hour in a twenty-four hour period. Traffic distributions are generated for the intervals between each point, according to a distribution specified by the user. An overall traffic profile is then created these distributions. As part of the user specification, the user can designate a call hold time for the time duration. The call hold time is based upon at least one parameter and a distribution. The traffic profile and the call hold time is then sent to a call generator to test the system.

Another aspect of the disclosure is a traffic distribution generator. The generator has a traffic graphical user interface. The generator has user inputs that allow the user to select a number of calls per time period for a predetermined number of points in time and to select a distribution to be used between the points in time. A processor then generates a traffic profile based upon the user inputs and transmits it to a bulk call generator.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
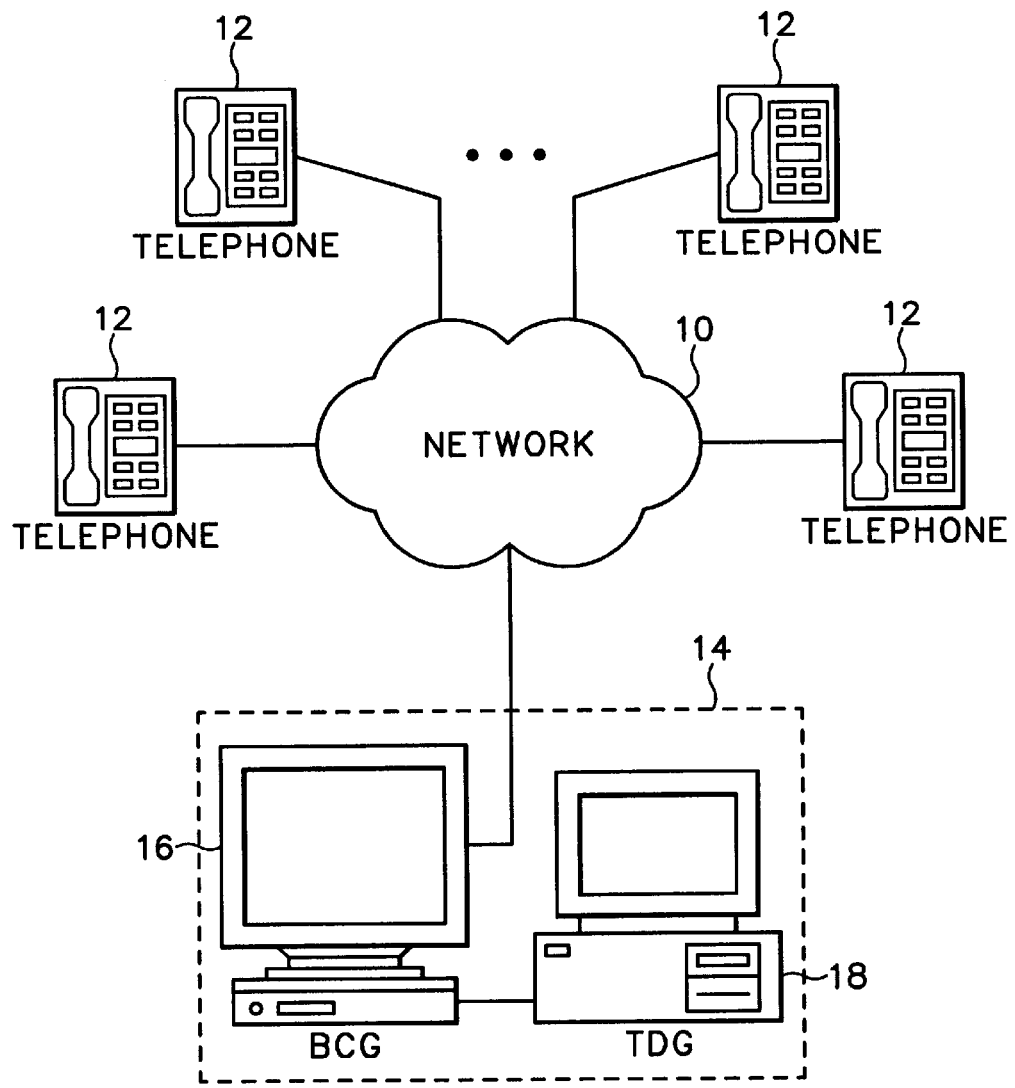
FIG. 1 shows a block diagram of a telephone network configured to be tested, in accordance with the invention.

FIG. 1 shows a telephone system configured to be tested. The network 10 could be one of any kind of network, including PSTN, ISDN or data, or a mix of those three plus others. Similarly, while the equipment connected to the network is shown to be telephones, such as telephone 12, these are only intended as examples and are not intended to limit the application or scope of the invention. For example, the phone 12 could be a personal computer or other computing device configured to handle Voice over Internet Protocol (VoIP) or other voice over data networks applications. Alternatively, the phone 12 could actually be a modem, a bridge, or a gateway between a data network and an ISDN network, as further examples.

In order to test the network, one of the devices attached to the network may be configured to perform the testing. In the example of FIG. 1, the network device 14 comprises a traffic distribution generator 18 and a bulk call generator 16. In some instances, the traffic distribution generator and the bulk call generator may be on two different network devices. The testing may be performed prior to implementation of the network, or after a network failure.

However, a shortcoming in current testing tools exists with regard to complexity and flexibility. Requiring complex inputs and long processes to set up a test is not productive, especially if the testing is being done after a network failure. In order to minimize downtime, the test needs to be run quickly. Running tests quickly require easy and user-friendly ways to enter data into the testing system. Further, the users of the system should have the capability of defining the test to match their typical traffic patterns, not some predetermined traffic pattern that is unrelated to the real environment in which the system will or has functioned.

As mentioned above, one method for testing a telephone network involves placing or configuring a device on the network for testing. The device will generate signals in accordance with input traffic data and then will use those signals to test the system. For ease of discussion, the function of providing the traffic data is separated from the signal generator, although they could be done by one module. In the example of FIG. 1, the signal generator has a bulk call generator that generates calls and measures resulting system parameters. The measured parameters may include delay time for signals to traverse the network from one endpoint to another, as well as intermediate stops, voice call jitter, call set up and call disconnect times. Many other parameters are possible, these are only intended as examples.

In order to generate the calls, however, some form of traffic pattern must be provided to guide the call generator. The number of calls to be sent during a give time period, the length of the call hold time, the distribution of traffic patterns, and other types of information allow the call generator to produce signals in a simulated traffic pattern. In the embodiment of FIG. 1, these capabilities are provided by the traffic distribution generator 18.

Figure 2:
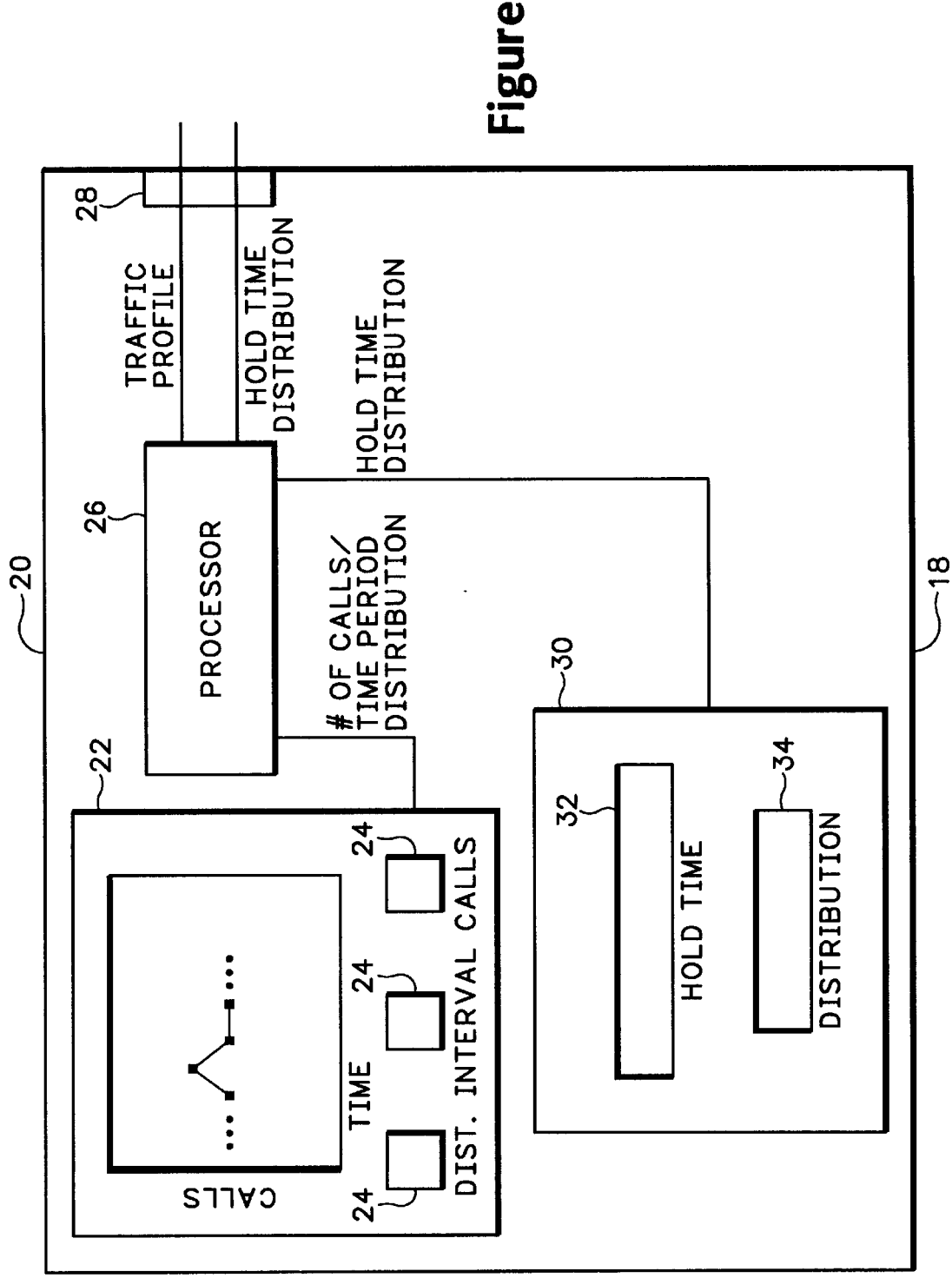
FIG. 2 shows a block diagram of a traffic distribution generator, in accordance with the invention.

A more detailed example of a traffic distribution generator is shown in FIG. 2. Generally, the traffic distribution generator will allow users to easily enter their traffic data into the test system, ensuring that the tests run simulate the real environment of the network when operating. The users of this type of system are not typically the network users, those people who utilize the network to make calls. The user referred to here are those performing the testing and measuring of the system.

The traffic distribution generator provides the user with a traffic graphical interface 20. The interface 20 includes user input controls 24 through which the user can designate calls per time period for a predetermined number of points in time, referred to as the call profile. The controls also allow the user to input the distribution to be used between the points. The user can immediately see the designation for each point in time on the profile display 22, allowing for accurate modeling of traffic patterns.

The processor 26 then takes the user inputs and generates traffic distributions for the time intervals between the designated points in time. For example, if the user designates a number of calls per second for every hour of a twenty-four hour period, the distribution would be used to determine the traffic pattern between the two hour marks. This will be discussed in more detail with regard to FIG. 3. The processor then generates a traffic profile from these distributions and then transmits those through a port 28 to the call generator. The port may comprise a communications port, such as if the call generator is on another device. Alternatively the port could just be a data line or wire trace on a printed circuit board between two integrated circuits, or a data path within one integrated circuit.

The traffic distribution generator may also provide the user with a hold time GUI 30. User controls on this GUI, such as those at 32 and 34 allow the user to designate at least one call hold time and a hold time distribution. Depending upon the hold time distribution designated, there may be more than one call hold time needed. This will be discussed in more detail with regard to FIGS. 4a and 4b. The traffic GUI and the hold time GUI may be displayed to the user on a screen such as in a personal computer. The two GUIs may be displayed together or separately.

Having discussed the traffic distribution generator in general terms, it is helpful to discuss a specific example of the user interfaces, to allow better understanding of the invention. However, it must be noted that the images of FIGS. 3, 4a and 4b are only intended as examples and are not intended to limit the scope of the invention in any way.

Figure 3:
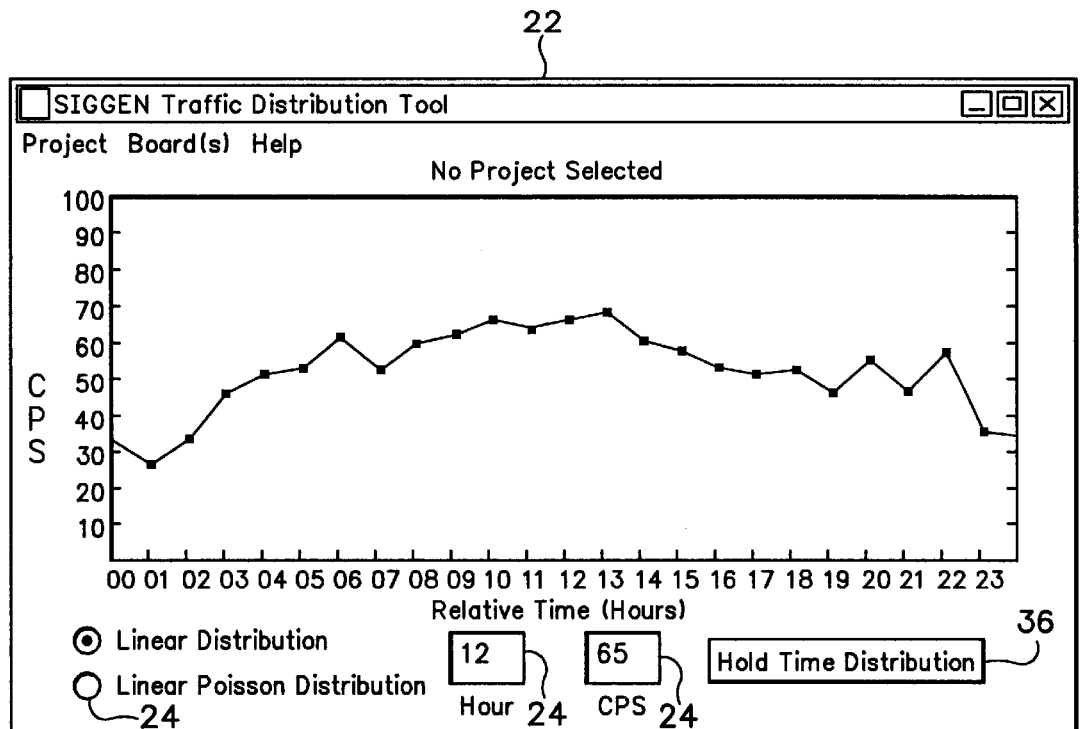
FIG. 3 shows an example of a traffic graphical user interface, in accordance with the invention.
Figure 4A:
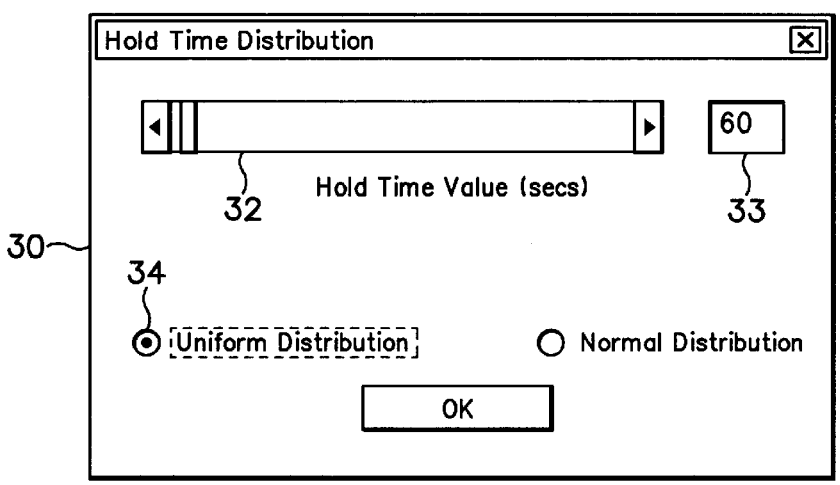
FIGS. 4a and 4b show examples of a hold time graphical user interface, in accordance with the invention.
Figure 4B:
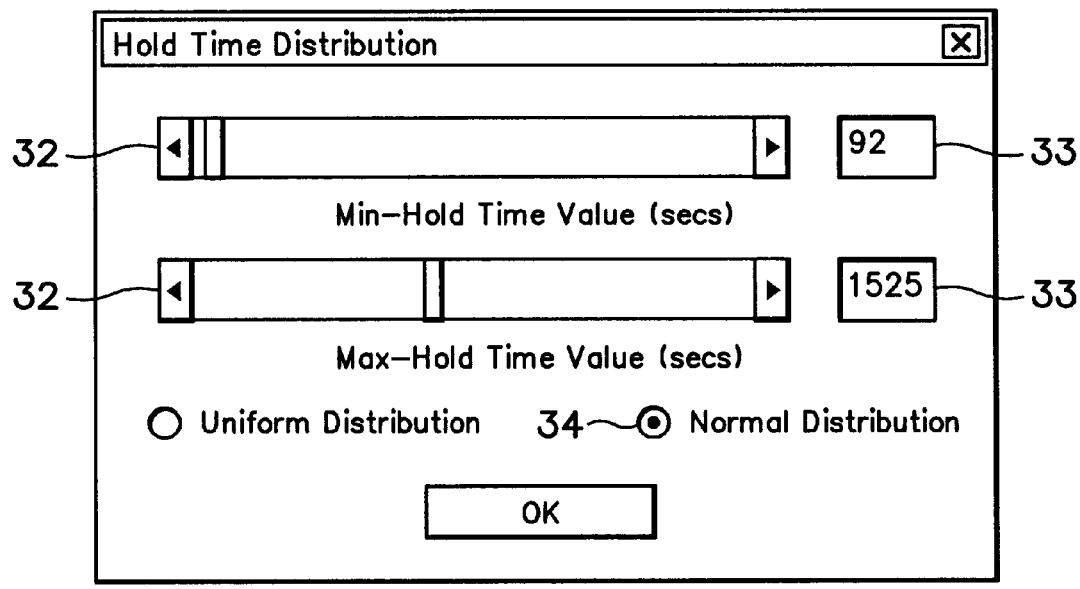

FIG. 3 shows one example of a traffic GUI, in accordance with the invention. In this example, the user is able to create a call profile by designating a number of calls per second (CPS), displayed on the y-axis, for each hour of a twenty-four hour duration of time. The window 22 allows the user to verify the call profile data. As can be seen by this particular example of the user controls 24, the user types in the hour number and the number of calls per second. The user also designates a distribution. The choices shown in this example include either a linear distribution or a linear Poisson distribution. These are only examples, as any statistical distribution could be used to determine the traffic during the intervals between the points in time.

The distribution allows the traffic distribution generator to generate traffic distributions between the designated points in time, in this example between the hours. This allows the user to have control over most of the information used to generate calls, without requiring so much information as to be burdensome. Without the distributions, for example, the user would either have to designate the number of calls per second for every minute of every hour, or would have a less accurate call profile. If the user were to enter the number of calls per second for each hour, and no distribution was used, the traffic profile would be steady call volumes from one hour marker to the next hour marker.

For example, if the user designated 65 CPS for hour 12 and 70 CPS for hour 13, the traffic profile used by the call generator would require 65 CPS for the entire twelfth hour until the thirteenth hour mark occurred. The call generator would then increase the call volume to 70 CPS for the next hour. This does not provide very accurate testing data. Generating traffic distributions based upon the two end points of each interval allows for more realistic call profiling.

In this example, the distribution selected is a linear distribution. The linear distribution will generate traffic that follows the linear track of every segment between adjacent hours as defined by the graph shown in 22. The alternative selection shown here is for a linear Poisson distribution. This distribution will generate traffic distributions that follow a Poisson distribution centered on the linear track between adjacent hour points. Again, these are only examples and many other distributions could be used.

As part of the traffic distribution generator, as discussed above, the user may also designate the call hold times. In FIG. 3, the GUI includes a hold time distribution shortcut button. This is optionally provided on the traffic GUI and access to a hold time GUI could be provided in many other ways. Similarly, while the calls per time period and time period designations are shown as typed-entry fields on the GUI, these could be provided in many other way, as could the radio button selections for distributions. Alternatives include, but are not limited to, radio buttons, check boxes, pull-down menus, and many other familiar user input mechanisms.

Examples of the hold time GUI that would be presented to the user upon selection of the "Hold Time Distribution" button of FIG. 3 are shown in FIGS. 4a and 4b. As can be seen in FIG. 4a, a hold time GUI for a uniform distribution is provided. The user designates a time interval for the hold time to be distributed uniformly. In this example, the user designates a hold time using the slider bar 32. The value of the hold time is displayed in window 33. Again, other types of user input mechanisms can be used and these are just intended as examples.

If the user selects the normal distribution radio button, another dialogue box appears, such as that shown in FIG. 4b. In this case, using a normal distribution, the user provides two call hold times, a minimum and a maximum. The user provides these through slider bars 32, with the corresponding values being displayed in the windows 33. The use of slider bars has an advantage in that the user has to remain within a specified time period. For the particular example of a twenty-four hour duration of time, with the points in time being on the hour marks, the call hold time can be constrained to be between 0 and 3600 seconds, or under an hour.

Depending upon the duration of time and the time periods designated, this constraint can be altered. For example, if the user wanted to simulate a week-long traffic pattern, the duration of time could be 168 hours. The points in time could be broken down into 4 blocks. The hold time would then be constrained to be between 0 and 4 hours.

Figure 5:
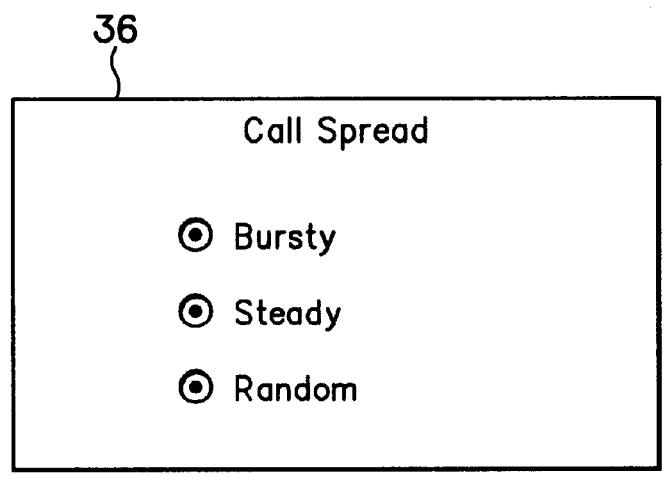
FIG. 5 shows an example of a user interface allowing users to select a call spread, in accordance with the invention.

In addition to designating the traffic distribution and call hold times, the user can designate the call spread within each interval of the distribution. This is independent of whatever distribution is selected. In one embodiment of the invention, there are three possible selections for call spread within each one-second interval. The options are 'bursty,' 'steady,' or 'random,' as shown in the user interface 36 of FIG. 5.

Selecting option 'bursty' clusters the calls at the start of each interval, such as the start of each one-second interval in the example above. A steady call spread spreads the calls evenly across the interval. A random call spread spreads the calls randomly. The number of calls per interval is determined by the distribution selected from the user interface in FIG. 3. Similar to the call hold times, the selection of the interval period, such as the one second intervals in the example above, are left to the system designers.

Referring back to FIG. 2, it can be seen that once the user has provided the information discussed above, it is sent to the bulk call generator that then generates the actual data used. The traffic distribution generator provides the traffic profile generated from the user inputs on the traffic GUI and at least one call hold time and the designated distribution from the hold time GUI. It must be noted that the bulk call generator and the traffic distribution generator may use the same processor. In this instance, this data would then be provided to the bulk call generator functions within the same processor.

Figure 6:
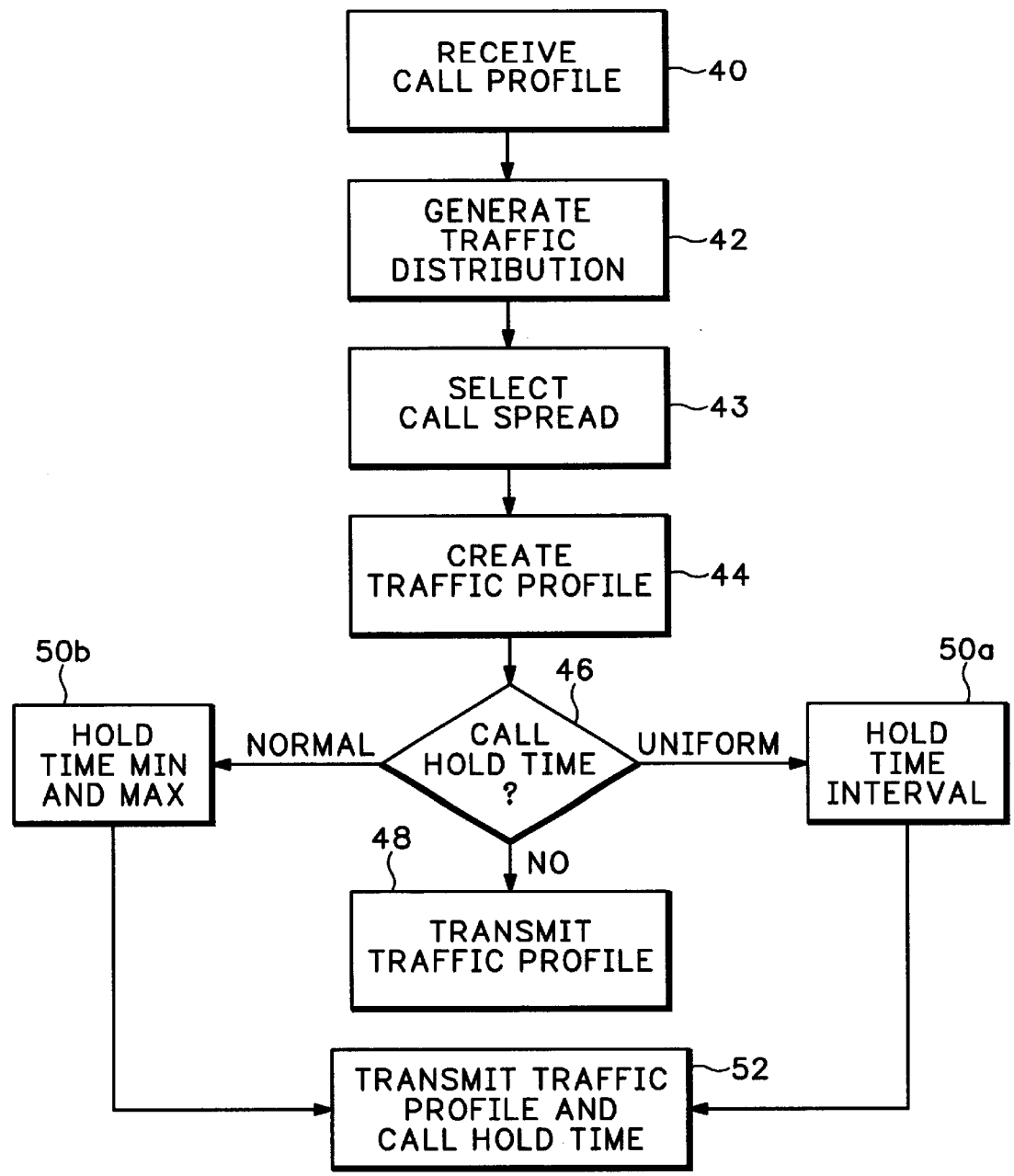
FIG. 6 shows a flow chart of one embodiment of a method to generate and distribute telephone traffic, in accordance with the invention.

The general method for generating the traffic distribution is shown in FIG. 6. The call profile is received from the user at 40, as defined above. The traffic distributions between each adjacent point in time are generated at 42. Optional step 43 allows the user to designate the call spread for whichever distribution is selected in 42. These traffic distributions and call spreads are then gathered to create a traffic profile at 44. At 46, the system process determines whether or not the user is going to provide a call hold time and distribution. If not, the traffic profile is transmitted to the call generator at 48. If a call hold time is going to be provided, and the distribution is selected to be uniform, the hold time interval is received at 50*a*. If the distribution is a normal distribution, the hold time minimum and maximum are received at 50*b*. The call hold time, the hold time distribution and the traffic profile are all then transmitted at 52.

It must be noted that this particular embodiment of a process assumes that a call hold time provided will be either uniformly or normally distributed. Other distributions are possible, and the demonstration of these particular distributions is only for ease of discussion and relation back to the examples in FIGS. 4*a* and 4*b*. No intention of limiting the scope or application of the invention is intended.

In some implementations, the traffic distribution generator will be established by execution of software code on a network or other computing device. A computer-readable medium will include the instructions that, when executed, implement the methods of the invention and establish the traffic distribution generator.

In this manner, a user is provided a convenient user interface for entering call profile information into a telephone network testing system. It allows the user to easily simulate a traffic pattern, allowing more control over the testing parameters, while not requiring a large number of inputs. Display of the resulting call profile also allows the user to check the accuracy of the profile and make adjustments as necessary.

Thus, although there has been described to this point a particular embodiment for a method and apparatus for a traffic distribution generator, it is not intended that such specific references be considered as limitations upon the scope of this invention except in-so-far as set forth in the following claims.

What is claimed is:

1. A method for generating and distributing telephonic traffic, the method comprising:

receiving a call profile from a user test interface, wherein the call profile identifies a number of calls per time period for each of a series of points within a duration of time;

generating simulated traffic statistical distributions for intervals between the points;

creating a simulated traffic profile from the traffic distributions;

receiving at least one call hold time from a user interface; and transmitting the simulated traffic profile file and the at least one call hold time to a call generator to test multiple network devices across a network in a state, wherein the state is one of either prior to network implementation or after network failure.

2. The method of claim 1, wherein the simulated traffic distributions are linear distributions.

3. The method of claim 1, wherein the simulated traffic distributions are linear Poisson distributions.

4. The method of claim 1, wherein the method further comprises receiving a call spread from a call spread user interface.

5. The method of claim 4, wherein the call spread is bursty.

6. The method of claim 4, wherein the call spread is steady.

7. The method of claim 4, wherein the call spread is random.

8. The method of claim 1, wherein at least one call hold time further comprises a hold time interval with a uniform distribution.

9. The method of claim 1, wherein at least one call hold time further comprises a hold time minimum and a hold time maximum with a normal distribution.

10. The method of claim 1, wherein the number of calls per time period further comprises the number of calls per second.

11. A traffic distribution generator, comprising:

a traffic test graphical user interface for use during network testing of multiple network devices across the network in a state, wherein the state is either prior to network implementation or after network failure;

user input controls on the traffic test graphical user interface operable to allow the user to select a number of calls per time period for a predetermined number of points in time and to select a distribution;

a processor operable to generate simulated traffic statistical distributions based upon the number of calls for each of the predetermined number of points in time and the distribution and create a simulated traffic profile from the distributions; and a port operable to transmit the simulated traffic profile to a bulk call generator.

12. The traffic distribution generator of claim 11, wherein the traffic distribution generator and the bulk call generator are located on the same network device.

13. The traffic distribution generator of claim 11, wherein the traffic distribution generator and the bull call generator are located on different network devices.

14. The traffic distribution generator of claim 11, wherein the number of calls per time period is substantially equal to a number of calls per second.

15. The traffic distribution generator of claim 11, wherein the distribution is one of the group comprised of: a normal distribution, and linear Poisson distribution.

16. The traffic distribution generator of claim 11, wherein the generator further comprises:

a hold time graphical user interface; and user input controls on the hold time graphical user interface operable to allow the user to designate at least one call hold time and a hold time statistical distribution, wherein the at least one call hold time and the hold time distribution are transmitted through the port with the simulated traffic distribution to be used to test a network during a state, wherein the state is one of either prior to network implementation or after network failure.

17. The traffic distribution generator of claim 12, wherein the at least one call hold time further comprises one call hold time and the hold time distribution is uniform.

18. The traffic distribution generator of claim 12, wherein the at least one call hold time further comprises a minimum call hold time and a maximum call hold time and the call hold time distribution is normal.

19. A computer-readable medium containing software code that, when executed, results in:

reception of a call profile from a user test interface, wherein the call profile identifies a number of calls per time period for each of a series of points within a duration of time;

generation of simulated statistical traffic distributions for intervals between the points;

reception of at least one call hold time from a user interface; and transmission of the simulated traffic distributions and the at least one call hold time to a call generator to test multiple network devices across a network in a state, wherein the state is one of either prior to network implementation or after network failure.

20. The computer readable medium of claim 19, wherein the software code, when executed, generates linear simulated traffic distributions.

21. The computer readable medium of claim 19, wherein the software code, when executed, generates linear simulated Poisson traffic distributions.

22. The computer readable medium of claim 19, wherein the at least one call hold time parameter further comprises a call hold time interval distributed uniformly.

23. The computer readable medium of claim 19, wherein the at least one call hold time parameter further comprises a call hold time minimum time, a call hold time maximum time, to be distributed according to a normal distribution.

24. A traffic distribution generator, comprising:

means for presenting a traffic test graphical user interface;

means for receiving user inputs from the traffic test graphical user interface operable to allow the user to select a number of calls per time period for a predetermined number points in time and to select a distribution;

means for generating a simulated traffic statistical distribution based upon the number of calls for each of the predetermined number of time periods and the distribution; and means for transmitting the simulated traffic profile to a network device to test multiple network devices across a network in a state, wherein the state is one of either prior to network implementation or after network failure.

25. The traffic distribution generator of claim 24, wherein the generator further comprises:

means for generating a hold time graphical user interface; and means for receiving user inputs on the hold time graphical user interface operable to allow the user to designate at least one call hold time and a hold time statistical distribution, wherein the at least one call hold time and the hold time distribution are transmitted through the port with the traffic profile.

* * * * *